United States Patent
Borromeo

(10) Patent No.: US 9,639,234 B2
(45) Date of Patent: May 2, 2017

(54) DYNAMIC CONTROL SCHEMES FOR SIMULTANEOUSLY-ACTIVE APPLICATIONS

(71) Applicant: QUALCOMM Incorporated, San Diego, CA (US)

(72) Inventor: Theodore John Borromeo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 112 days.

(21) Appl. No.: 14/849,901

(22) Filed: Sep. 10, 2015

(65) Prior Publication Data

US 2017/0075539 A1    Mar. 16, 2017

(51) Int. Cl.
*G06F 3/0481* (2013.01)
*G06F 9/44* (2006.01)
*G06F 3/0488* (2013.01)

(52) U.S. Cl.
CPC ........ *G06F 3/04812* (2013.01); *G06F 3/0488* (2013.01); *G06F 9/4443* (2013.01)

(58) Field of Classification Search
CPC ... G06F 3/0488; G06F 3/04812; G06F 9/4443
See application file for complete search history.

(56) References Cited

U.S. PATENT DOCUMENTS 7,429,993 B2    9/2008  Hui
7,549,130 B2    6/2009  Keim
(Continued)

FOREIGN PATENT DOCUMENTS

CN    102243889 B    12/2014
EP    1748354 A1    1/2007
(Continued)

OTHER PUBLICATIONS

Edwards W.K., "Flexible Conflict Detection and Management in Collaborative Applications," Proceedings of the 10th annual ACM symposium on User interface software and technology, 1997, pp. 139-148.

(Continued)

*Primary Examiner* — Gerald Johnson
(74) *Attorney, Agent, or Firm* — The Marbury Law Group, PLLC

(57) ABSTRACT

Methods, devices, and non-transitory process-readable storage media automatically configure or reconfigure input mechanisms to provide user inputs to simultaneously-active applications with input mechanisms that conflict. An embodiment method performed by a processor of a computing device may include recognizing that an overlapping control condition exists between simultaneously-active applications when a first control element of a first application and a second control element of a second application are configured to receive respective user inputs via a common input mechanism. When the processor determines that an overlapping control condition exists, available input mechanisms of the computing device may be identified, and one of the identified available input mechanisms may be reconfigured to provide the user inputs for one of the first control element or the second control element while the overlapping control condition exists. When the overlapping control condition no longer exists, the processor may return control inputs to normal configurations.

30 Claims, 8 Drawing Sheets

(56) References Cited

U.S. PATENT DOCUMENTS

| | | |
|---|---|---|
| 7,712,039 B2 | 5/2010 | Banks |
| 8,310,351 B2 | 11/2012 | Krahenbuhl et al. |
| 8,881,170 B2 | 11/2014 | Beilis et al. |
| 8,884,945 B2 | 11/2014 | Kelly et al. |
| 2010/0073329 A1* | 3/2010 | Raman ................ G06F 3/04883 345/177 |
| 2012/0007938 A1 | 1/2012 | Chiang |
| 2014/0157159 A1 | 6/2014 | Cudak et al. |
| 2014/0282272 A1 | 9/2014 | Kies et al. |
| 2014/0331238 A1* | 11/2014 | Liang ...................... G06F 9/542 719/320 |

FOREIGN PATENT DOCUMENTS

| | | |
|---|---|---|
| EP | 2312427 A2 | 4/2011 |
| EP | 2523083 A1 | 11/2012 |
| EP | 2854013 A1 | 4/2015 |

OTHER PUBLICATIONS

Park I., et al., "A Dynamic Context Conflict Resolution Scheme for Group-aware Ubiquitous Computing Environments," ubiPCMM 2005, pp. 42-47.

Scheifler R.W., et al., "The X Window System," ACM Transactions on Graphics, Apr. 1986, vol. 5 (2), pp. 79-109.

International Search Report and Written Opinion—PCT/US2016/039770—ISA/EPO—Sep. 12, 2016.

\* cited by examiner

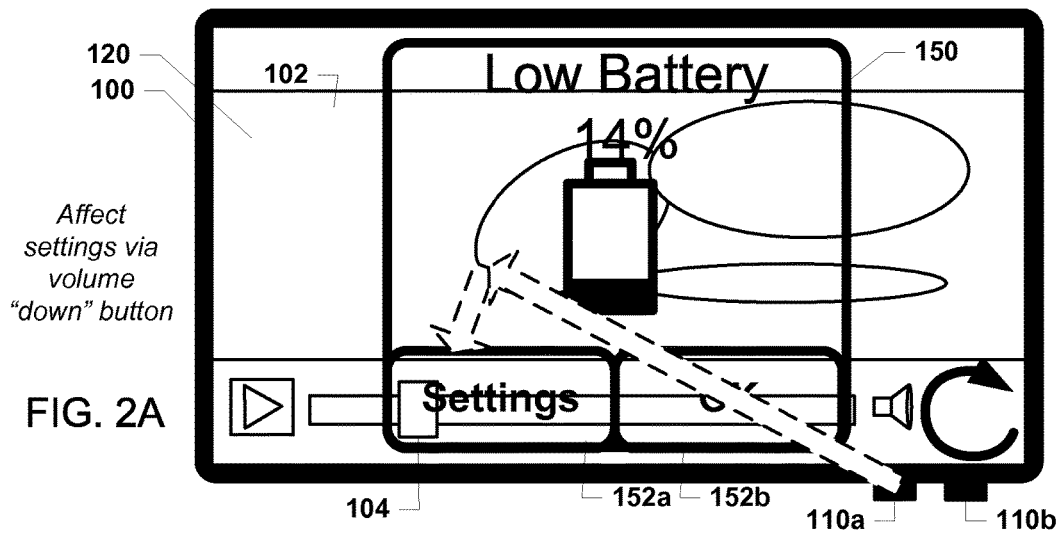
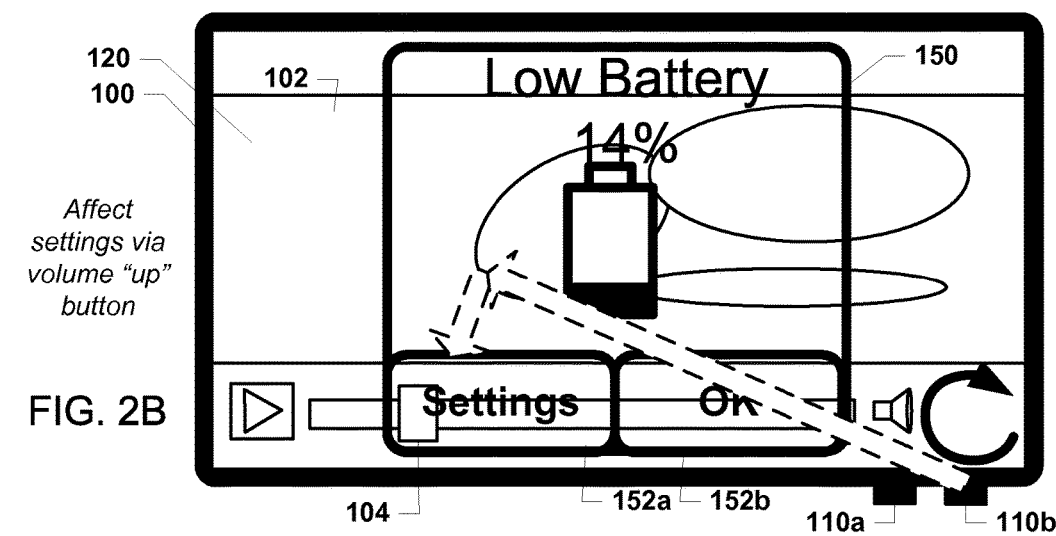
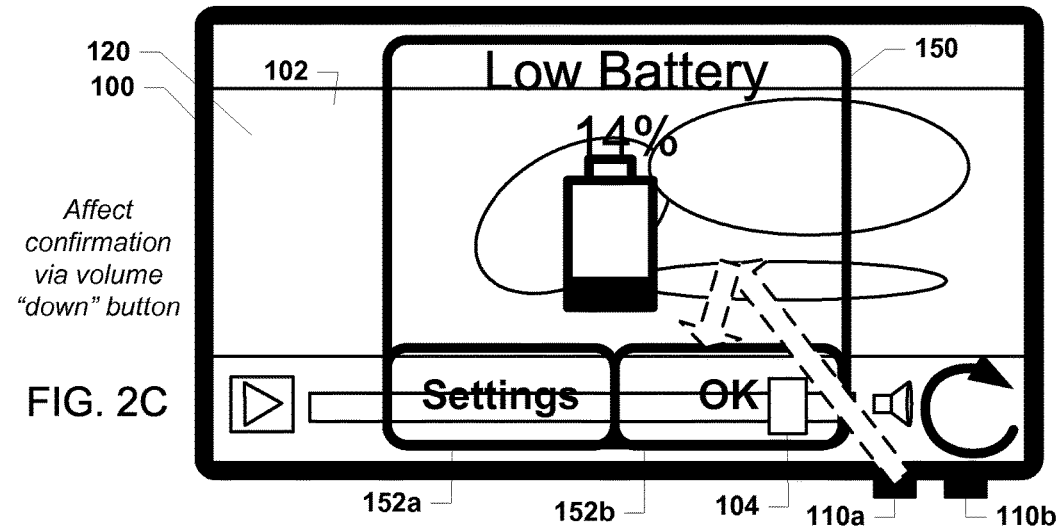

DYNAMIC CONTROL SCHEMES FOR SIMULTANEOUSLY-ACTIVE APPLICATIONS

BACKGROUND

Usability of devices often suffers when user interface elements of simultaneously-active applications overlap. For example, when graphical user interface (GUI) buttons of a first application (or app) are rendered over top of GUI buttons of a second app, the functions of the second app may not be fully accessible on a computing device. This can impact the user experience, especially when prompts requiring user acknowledgement are unpredictably overlaid on an already in-use application. Additionally, such situations may waste data and time, such as when streaming content is obscured from view due to overlaid GUI elements of an unexpected prompt.

SUMMARY

Various embodiments provide methods, devices, systems, and non-transitory process-readable storage media for automatically configuring input mechanisms supported by a computing device to receive user inputs for simultaneously-active applications. Various embodiment methods performed by a processor of a computing device may include determining whether an overlapping control condition exists among two (or more) simultaneously-active applications. An overlapping control conditions may exist when a control element (referred to as a first control element) of a first application and a control element (referred to as a second control element) of a second application are configured to receive user inputs via a common input mechanism, such as the same button or overlapping input icons on a touch screen display. When such an overlapping control condition is identified, the processor may identify available alternative input mechanisms supported by the computing device, such as alternative buttons available on the computing device or space on the touch screen display for rendering alternative input icons. Using this information, the processor may reconfigure one of the available alternative input mechanisms to support one of the applications by accepting user inputs for one of the first control element or the second control element while the overlapping control condition exists.

In some embodiments, a determination that an overlapping control condition exists may be arrived at in response to determining that touch screen display coordinates corresponding to the first control element and the second control element overlap.

In some embodiments, identifying available alternative input mechanisms on the computing device may include identifying input mechanisms supported by the computing device that are not currently configured to receive inputs for any control elements of the simultaneously-active applications. In some embodiments, the input mechanisms supported by the computing device may include a portion of a touch screen display, a hardware button on the computing device, a peripheral coupled to the computing device, a sound/voice recognition module, and a sensor coupled to the computing device.

In some embodiments, reconfiguring one of the identified available alternative input mechanisms to support one of the applications may include identifying one of the first application or the second application as a losing application based on input profiles of the first application and the second application, identifying an alternative input mechanism based on an input profile of the losing application, and reconfiguring the identified alternative input mechanism to receive user inputs for an overlapping control element of the identified losing application while the overlapping control condition exists. In some embodiments, the input profiles of the first application and the second application may include priority information and preferred alternative input mechanisms.

In some embodiments, reconfiguring one of the available alternative input mechanisms to support one of the applications may include rendering an additional visual element while the overlapping control condition exists, and reconfiguring a portion of a touch screen display corresponding to the additional visual element to receive user inputs for either the first control element or the second control element while the overlapping control condition exists. In some embodiments, the additional visual element may be a graphical user interface (GUI) button.

In some embodiments, the method may further include rendering a notification identifying the available alternative input mechanism that is reconfigured to receive the user inputs for one of the first control element or the second control element while the overlapping control condition exists. In some embodiments, the rendered notification may include an interactive selection list, and the method may further include receiving a user selection on the interactive selection list, and reconfiguring another of the identified available alternative input mechanisms to receive the user inputs for one of the first control element or the second control element while the overlapping control condition exists based on the received user selection.

Further embodiments include a computing device configured with processor-executable instructions for performing operations of the methods described above. Further embodiments include a non-transitory processor-readable medium on which is stored processor-executable instructions configured to cause a computing device to perform operations of the methods described above.

BRIEF DESCRIPTION OF THE DRAWINGS

The accompanying drawings, which are incorporated herein and constitute part of this specification, illustrate exemplary embodiments, and together with the general description given above and the detailed description given below, serve to explain the features of the claims.

FIGS. 2A-2C are diagrams of a mobile computing device display illustrating automatic remapping of input mechanisms to control elements according to some embodiments.

DETAILED DESCRIPTION

The various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the embodiments or the claims.

The various embodiments include methods that may be executed on a computing device to enable a user to provide inputs to each of two or more applications executing simultaneously that exhibit control inputs (e.g., icons on a touch screen display) that overlap.

The word "exemplary" is used herein to mean "serving as an example, instance, or illustration." Any implementation described herein as "exemplary" is not necessarily to be construed as preferred or advantageous over other implementations.

Figure 8:
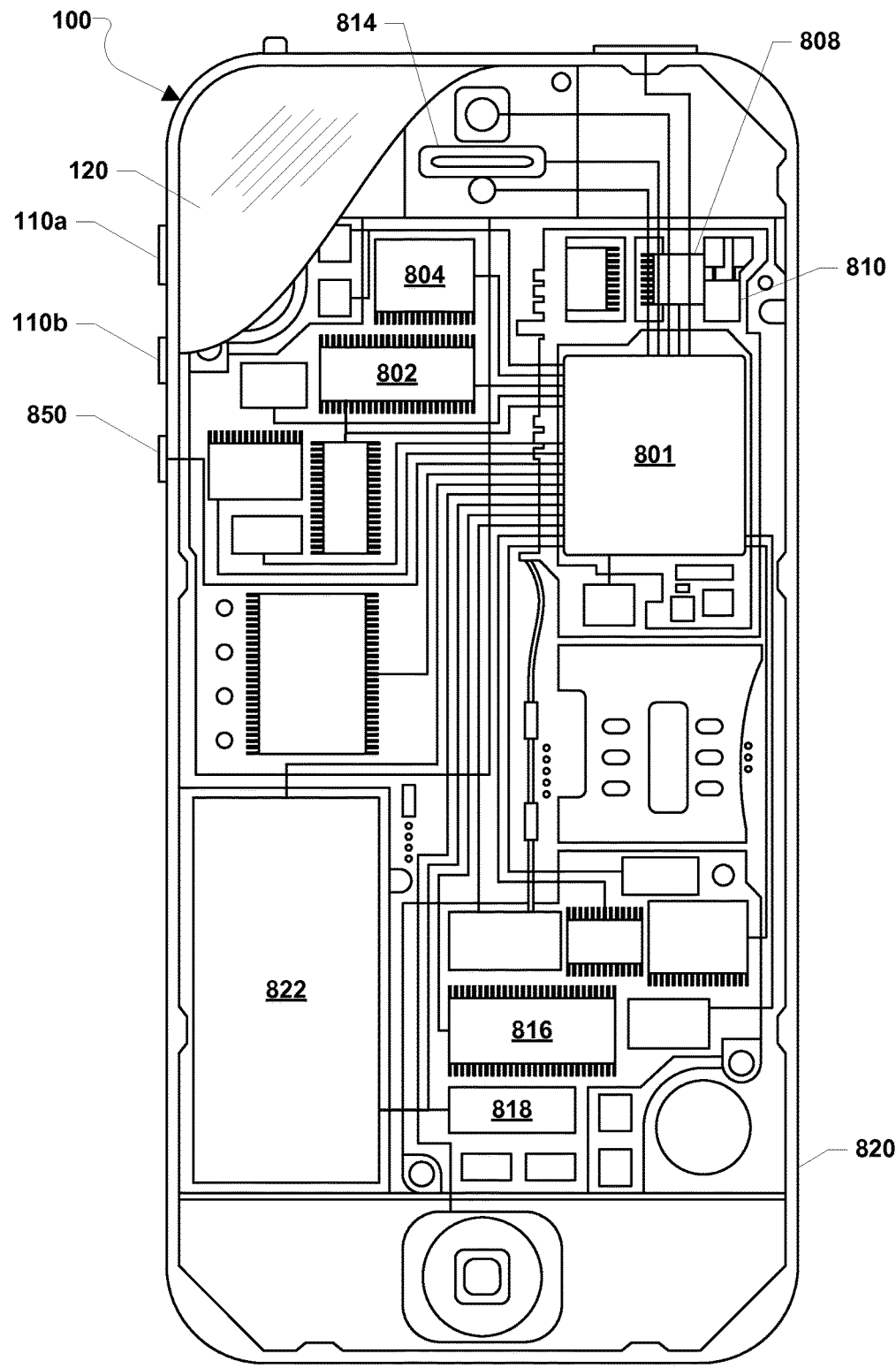
FIG. 8 is a component block diagram of a mobile computing device suitable for use in an embodiment.

The term "computing device" is used herein to refer to an electronic device equipped with at least a processor. Examples of computing devices may include computing devices (e.g., cellular telephones, wearable devices, smartphones, web-pads, tablet computers, Internet enabled cellular telephones, Wi-Fi® enabled electronic devices, personal data assistants (PDA's), laptop computers, etc.), personal computers, and server computing devices. In various embodiments, computing devices may be configured with memory and/or storage as well as networking capabilities, such as network transceiver(s) and antenna(s) configured to establish a wide area network (WAN) connection (e.g., a cellular network connection, etc.) and/or a local area network (LAN) connection (e.g., a wired/wireless connection to the Internet via a Wi-Fi® router, etc.). An exemplary smartphone-type mobile computing device is illustrated in FIG. 8.

The term "input mechanism" is used herein to refer to various hardware and/or software-generated elements supported by a computing device that enable a user to provide inputs for controlling application functionalities. Examples of input mechanisms may include an icon positioned on a touch screen display or a portion of a touch screen display (e.g., a subset of the touch screen display that is designated for use by a function of an application, a GUI button, etc.), a mechanical, hardware, tactile, or physical component (e.g., a hardware button, a switch, a dial, etc.), peripherals (e.g., a mouse, a stylus, etc.), a sound/voice recognition module, and/or sensors (e.g., a camera, an accelerometer, a gyroscope, a light sensor, a microphone, motion sensor, temperature sensor, barometric pressure sensor, magnetic field sensor, etc.). Computing devices may identify user inputs via various supported input mechanisms, such as touch inputs on a touch screen display or hardware button depressions, and to adjust and/or route signals reporting such identified inputs to various functionalities of the computing device, particularly functions or features of software, instructions, routines, and/or operations executing on the computing device (e.g., operating system services, applications, etc.).

The various embodiments may be executed to improve the user experience when applications executing on modern computing devices compete for the same space on a display and/or other input mechanism as a result of dynamic operations and/or scheduled operations, such as prompts or notifications. An "overlapping control condition" may occur when applications simultaneously running on a computing device utilize common input mechanisms that cause an overlap. For example, this condition may occur when an active application is interrupted by prompts or alerts generated by a second application that may have been running in the background. In some cases, an overlapping control condition may occur when the use of one input mechanism of a first application (e.g., tactile button, graphical user interface (GUI) elements displayed on a touch input, etc.) is blocked by another input mechanism of a second application. For example, an overlapping control condition may exist when a play GUI button for a video application executing on a mobile device is rendered on top of a volume GUI button of a phone application executing on the mobile device. As another example, an overlapping control condition may exist when two active applications attempt to configure the same tactile volume button to receive user inputs to two active applications. Such overlapping control conditions may prevent the user from easily accessing all the functions or features of the competing applications. This may interrupt or otherwise hinder a user's ability to respond to one or more of the competing applications. For example, when interacting with a first application, a user may be prevented from continuing to interact with the first application when a prompt from a second application is suddenly rendered over top of the first application.

Figure 1A:
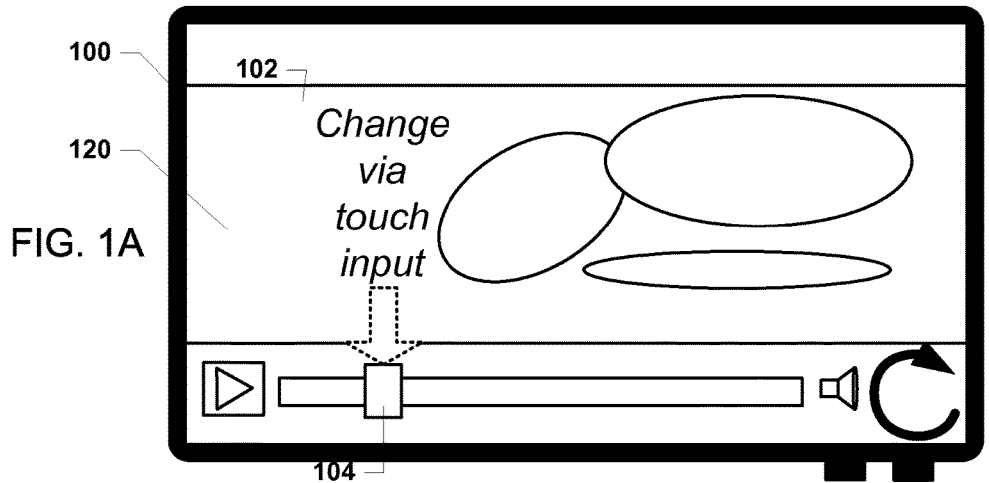
FIGS. 1A-1C are diagrams of a mobile computing device display illustrating examples of overlapping control conditions.
Figure 1B:
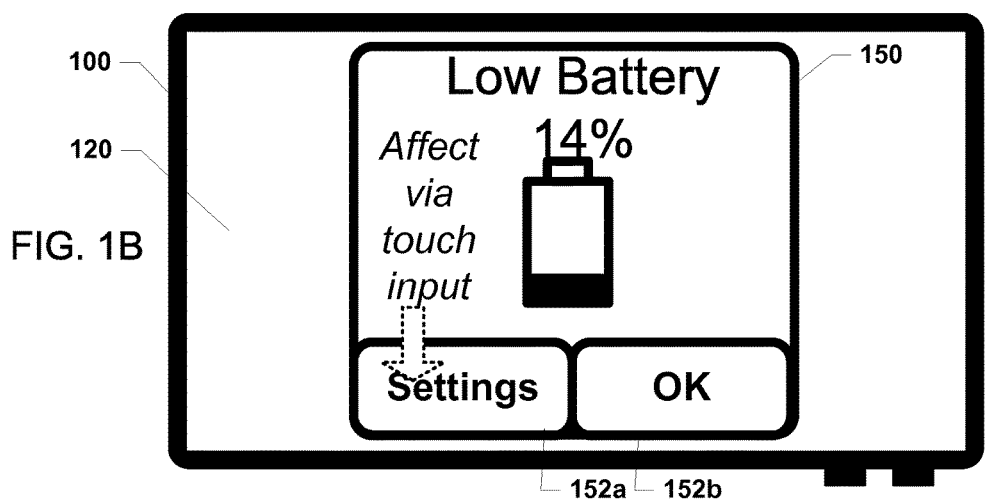
Figure 1C:
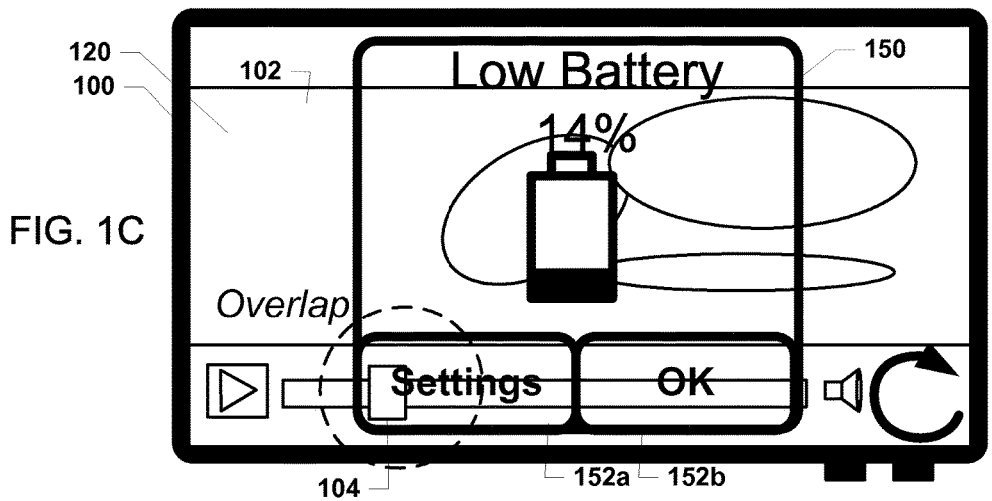

FIGS. 1A-1C illustrate an example scenario in which a computing device 100 experiences an overlapping control condition. FIG. 1A shows a first application display 102 of a first application (e.g., a video application or "app") executing on the computing device 100. As shown in FIG. 1A, the first application display 102 includes a progress slider control element 104 that may be controlled via touch inputs on the touch screen display 120. In the illustrated example, a user may click and draw the progress slider control element 104 to change the current time of the video. For example, the user may place a finger on the slider control element 104 and move the finger in a left or right direction to "scrub" through a timeline of a playing video.

FIG. 1B shows a second application display 150 (e.g., a battery popup app or dialog box) generated by a second application that includes a settings button control element 152a and a confirmation button control element 152b that may be controlled via touch inputs on the touch screen display 120. The illustrated example second application display 150 might be rendered when the computing device 100 experiences a low battery state.

FIG. 1C illustrates the overlapping control condition that occurs when both application displays 102 and 150 are simultaneously active and rendered in common portions of the touch screen display 120. In the overlapping control condition, one or more control elements of the applications are rendered in the same location on the touch screen display. For example, as shown in FIG. 1C, the settings button control element 152a of the second application display 150 and the progress slider control element 104 of the first application display 102 share the same area on a touch screen display, and the user interacts with both control elements by touching the touch screen display 120 at the position of the control elements 152a and 104. Typically the topmost control element rendered on a touch screen display is active. As a result, if a user touches the location on the touch screen display corresponding to the progress slider control element 104, the computing device will interpret that touch as an input on the settings button control element 152a of the second application display 150. Thus, the overlapping control condition prevents the user from accessing the progress slider control element 104 to manipulate the video application.

The various embodiments provide methods, devices, and non-transitory process-readable storage media that automatically reassigns input mechanisms for one or more control elements of simultaneously-active applications during overlapping control conditions. A processor of a computing device (e.g., a smartphone computing device) may continually evaluate the operating states of the applications executing on the device to determine whether there are any overlapping control element conditions. Such evaluations may include identifying the currently used or assigned input mechanisms for each of the applications executing on the computing device and determining whether any of the input mechanisms of the applications overlap. For example, the processor may evaluate the touch screen display coordinates of all GUI buttons of all applications rendered on the touch screen display to determine whether any of the rendered GUI buttons overlap or otherwise conflict with one another.

When an overlap or conflict in control element coordinates is detected (indicating that an overlapping control condition exists), the processor may identify alternative input mechanisms (e.g., hardware volume buttons, power button, sensors, etc.) that are not being used and thus are available for reconfiguring to provide a control element for one (or more) of the conflicting applications. For example, the processor may identify portions of the touch screen display that are not being used, and thus represents real estate that could be used for repositioning a conflicting GUI button. As another example, the processor may identify a physical button (e.g., a volume button on a smartphone) that is not associated with an input for an active application, and thus is available for reconfiguring to support a conflicting application. The processor may automatically reconfigure (or remap) an available input mechanism to serve as a new input mechanism for one of the overlapping control elements.

Repositioning or remapping an application input to an available input mechanism may enable the user of the computing device to interact with both of the simultaneously running applications. For example, the computing device may automatically reassign an available volume button, home button, new GUI button, voice command, peripheral, and/or sensor to be used to receive user input for a functionality of an application (i.e., a "losing" application) in place of the application's default input mechanism. In this manner, methods according to various embodiments may maintain simultaneous display and control of applications by providing dynamic, non-conflicting control schemes that enable users to continue to provide inputs to applications in case of overlapping control conditions.

In various embodiments, the processor may identify input mechanisms assigned to each control element of applications executing on the computing device. In some embodiments, the processor may utilize input profiles associated with the various active applications in order to identify assigned or otherwise used input mechanisms for the applications. The active application input profiles may include information about each application and/or individual control elements of each application. Such information may include data that may be used to identify priority information or rankings for the application and/or input mechanisms and/or control elements of applications, touch screen display coordinates of control elements, minimal or required input mechanisms, predefined alternative input mechanism mappings, and/or input characteristics associated with GUI elements of the applications (e.g., accessed via swipe, tap, etc.). In some embodiments, input profiles may include data that indicates the native, preferred, and/or alternative touch input type(s) for various control elements of applications.

In some embodiments, the processor may utilize the input profiles to determine whether overlapping control conditions exist. For example, the processor may compare input mechanisms indicated in the input profiles of simultaneously-running applications to identify whether one or more overlaps of control elements exist. In one example, predefined GUI elements and respective screen locations that are indicated within the input profiles may be evaluated by the processor to detect whether sliders, buttons, etc. from a first application share the same area on the touch screen display as active GUI elements of a second application.

In some embodiments, the processor may perform run-time evaluations of the input mechanisms used by various applications to identify overlapping control conditions. Such run-time operations may identify currently rendered (or "popped-up") GUI elements of various applications and may compare the screen space occupied by input icons of active applications and the popped up GUI elements to detect overlaps among the GUI elements. For example, the processor may compare the screen coordinates of each GUI button rendered by a first application to the coordinates of any GUI elements rendered by a second application in order to detect overlaps. Such a run-time technique may be useful to application developers because it may enable use of dynamic, friendlier approaches to layout interfaces, such as by using XML-based approaches to design webpage layouts with fluid positions for user interface elements instead of specifying absolute positions or touch screen display coordinates and/or controls used by applications.

In some embodiments, the processor may use input profiles to identify appropriate and available input mechanisms for remapping. For example, the processor may select a particular available button to receive user inputs to an application functionality by selecting from a stored list of preferred alternative input mechanisms. In some embodiments, the processor may use data of the input profiles to identify a priority between applications having overlapping control elements. For example, based on ranking data within the input profiles of a first application and a second application, the processor may determine that the second application has a lower priority, and therefore reconfigure an alternative input mechanism (e.g., a volume button) to support the conflicting control element of the second application. In some embodiments, rankings or priorities of applications may be based on occupied screen space (e.g., the application that is rendered on top may have the highest ranking, etc.).

In some embodiments, the processor may resolve overlapping control conditions based on a first-come, first-served basis, allowing an application having an earlier active time (e.g., first to be launched, first to display, etc.) to maintain native (or preferred) input mechanism mappings while the second application to start is assigned alternative input mechanisms for conflicting control elements.

In some embodiments, the processor may resolve overlapping control conditions based on various other ranking or priority schemes, such as a last-come, first-served basis (e.g., latest to render may be allowed to maintain default input mechanisms), ranking data within input profiles of applications, user inputs or selections, or any combination of schemes.

In some embodiments, the processor may perform remapping operations that include creating new, additional GUI elements on-the-fly for receiving user inputs for an application with conflicting control elements. For example, in response to determining that the input mechanisms for receiving inputs for a fast-forward functionality of a video player app should be reassigned due to an overlapping control condition, the processor may create a new GUI control element (e.g., a virtual button) that was not previously defined by the video player app. Such a new GUI control element may be touched by the user in order to provide an input to provide an input to the application that previously would have been provided by the conflicting control element.

In some embodiments, the remapping of input mechanisms may include remapping to different types of inputs. In other words, the processor may map certain types of touch inputs (e.g., swipes, directional swipes, taps, tap/holds, etc.) to particular control elements of applications during overlapping control conditions. For example, when two GUI buttons overlap, the processor may not change tap input mapping a first one of the two GUI buttons, and reassign swipe touch inputs to the second GUI button.

The computing device processor may interpret or scrutinize the characteristics of user inputs to distinguish between intended inputs for applications when there are overlapping control conditions. For example, the processor may identify a touch input as a swipe (vs. a tap/hold) and apply that swipe input to whichever of the overlapping application GUI element of the conflicting applications that is mapped to only swipe inputs. Such a method may effectively disable unwanted interactions with either application based on how the user provides inputs.

In some embodiments, the processor of the computing device may adjust various other characteristics of applications (and/or control elements) during overlapping control conditions. For example, the processor may adjust a transparency setting (e.g., an alpha channel) or other visual attributes of an application or individual control elements associated with remapped input mechanisms in order to promote visibility of an overlapped application. For example, while both a video app and a camera app are simultaneously-active and the camera app is determined by the processor to have a lower priority (or is otherwise considered a secondary app), the processor may render the camera app (e.g., a viewfinder screen of the camera app) in a semi-transparent manner over the video app. The use of semi-transparent rendering may enable a user continue watching a video via the video app while using the viewfinder for taking a picture via the camera app.

In some embodiments, the computing device may be configured to provide notifications and/or other informational elements to inform a user about overlapping control conditions and/or remapped input mechanisms. For example, during an overlapping control condition, the computing device processor may render over a control element of a losing application an icon or visual element that graphically conveys how the user can now control the function of the application. For example, the processor may render a symbol that depicts or points to a volume button currently configured to receive user inputs when a GUI button of a second application is in conflict with a GUI button of a first application.

In some embodiments, the computing device may be configured to prompt a user to provide selections or other guidance to be used by the processor to adjust automatic remappings of input mechanisms for overlapping control elements. For example, when inputs for changing a volume for an application are remapped from the volume buttons to a voice recognition module, the computing device processor may render a selection list indicating that a shake movement (sensed via accelerometer) may be used as an alternative input mechanism for providing volume inputs.

In some embodiments, the computing device processor may perform operations of the various embodiments via an input manager functionality. Such an input manager functionality may be a dedicated process, routine, application, logic, and/or circuitry that is configured to identify overlapping control conditions and automatically remap available input mechanisms to avoid reduction of the user's access of the applications.

The following is a non-limiting illustration. A mobile computing device processor may be configured with processor-executable instructions to provide an input manager that performs operations of the various embodiment methods. Via the input manager, the computing device may evaluate various data in real-time to detect an overlapping control condition. Data that may be evaluated by the input manager may include comparing predefined data from input profiles of currently executing applications. The input manager may determine that an overlapping control condition exists when a first GUI button of a browser app and a second GUI button of a music player app share the same area on a touch screen display and are rendered simultaneously. In response to identifying that the first GUI button of the browser app should not be reconfigured (e.g., the browser app is determined to have a higher priority or ranking), the input manager may determine that music player app is the "losing" application, and therefore the second GUI button needs to be moved or remapped. The input manager may make this determination, for example, based on predefined rankings from the input profiles of the applications or another priority scheme (e.g., first-come, first-serve, etc.). The input manager may identify currently available (i.e., not in use or reserved) input mechanisms on the tablet mobile computing device that can be configured to operate as a substitute input mechanism for the music player app. For example, the input manager may remap the input mechanism for the music player app to an accelerometer. This remapping may enable the user to control the function of the music player app by moving the tablet mobile computing device (e.g., shake, bump, swing, etc.) instead of touching the second GUI button while the overlapping control condition persists. This remapping may enable the user to control the browser app using the first GUI button while also manipulating an audio clip rendered via the music player app by shaking the computing device. When the user closes or minimizes the browser app, thereby eliminating the overlapping control condition, the input manager may configure the second GUI button to be used again for providing user inputs for the music player app. In another example, the input mechanism may not be switched until the app is closed, or the user has expressly requested returning to the default input mechanism.

The various embodiments thus enable simultaneously-active (or simultaneously-rendered) applications to continue to be presented in an original manner and location while enabling the user to continue providing inputs to applications in a consistent manner. For example, the user may continue typing or continue scrubbing through a video with a slider even when a pop-up window is unexpectedly rendered. Thus, the embodiment methods avoid tedious pauses typically required for a user to adjust the applications, avoid providing inputs to unintended applications due to unexpected display, and avoid the need to reposition or resize GUI elements due to overlapping control conditions. The embodiment methods may also improve the efficiency of computing devices and the user experience, as redundant operations to correct or overcome unintended actions may be avoided. For example, instead of re-rendering data missed due to an overlapping control condition that prevented the user from pausing a video playback, the computing device implementing embodiment methods may make simultaneous controls available at all times so that the user may immediately pause the video as needed and on demand, regardless of overlapping of applications.

The various embodiments provide methods that improve the way a user interacts with applications executing on a computing device when control elements of a plurality of the applications overlap (e.g., GUI buttons rendered at least partially over top of each other). The manner in which applications with conflicting control elements are displayed relative to other applications does not need to be modified. Instead, the input mechanisms assigned to applications may be reconfigured to support functionalities of the applications while there is an overlapping control condition. The control elements of a "winning" application may be maintained (i.e., not readjusted) while the control elements of a "losing" application are reassigned or remapped to alternative input mechanisms.

The embodiment methods may be used with screen sharing schemes that involve movement or adjustment of windows on a display, but do not require movement of display elements. This is because the remapping of control elements to available input mechanisms does not involve or require visual movements of the applications. For example, the embodiment methods may be used to remap input icons for applications that naturally use all of a computing device display to other device sensors (e.g., buttons, accelerometers, gyroscopes, etc.), thereby allowing both applications full use of all functions.

Although the embodiments described herein primarily address overlapping control conditions related to GUI control elements, various embodiments may be applied to any conflict in control overlap. For example, both a computing device system device volume setting and a video player app volume setting may be natively controlled via hardware volume buttons. When the video player app is active, this may cause the use of the volume buttons to adjust only the video player app volume setting without affecting the system volume setting. Using the embodiment methods, a processor of a computing device may reconfigure another input mechanism (e.g., a sensor input) to enable the user to control the system volume setting simultaneously with controlling the video player app volume setting with the volume buttons.

The following is an example of how the embodiment techniques may address other non-GUI control overlapping control conditions. A computing device configured to implement embodiment techniques may also execute a video application for receiving and rendering a video stream (a first app) and a camera application for taking images/videos (a second app). Both the first and second apps may use the touch screen display as the native (or default) input mechanism for receiving user inputs. For example, the first app may natively be configured to pause a video stream in response to a user tap on the touch screen display, and the second app may natively be configured to zoom-in and/or zoom-out in response to a user pinch on the touch screen display. The second app may also be natively configured to take a snapshot with the camera sensor in response to an input on software GUI button (e.g., a "snap" GUI button) and switch active cameras (e.g., front, rear) via a different software GUI button. Further, both apps may be natively configured to use the volume buttons. For example, the first app may adjust a playback volume of a video in response to a press on the hardware volume buttons and the second app may take a snapshot with the camera in response to a press of one of the hardware volume buttons.

Both the first app and the second app may be active simultaneously, such as when both are executing and rendered on the touch screen display in response to the user launching both apps. When the first and second apps are simultaneously active, the computing device experiences an overlapping control condition, because, as discussed above, the first app and the second app both use the same portion of the touch screen display for receiving inputs to pause and zoom/take pictures/switch active cameras, respectively. Further, the first app and the second app both use the volume buttons for user inputs; the first app using the buttons for volume control and the second app using a button as a shutter actuator. Thus, when attempting to watch a video via the first app and take a picture with the second app, the user will not be able to both adjust the volume and take a snapshot with the volume buttons and will not be able to use the touch screen display to both zoom/take pictures/switch active cameras and continue watching a video. To use the camera, the user must pause the video (e.g., the first app may interpret the zoom touch inputs for the second app to be a pause input for the first app). Otherwise, if the user presses a volume button in an attempt to take a snapshot, the camera app may not receive the input and instead the video app may change the volume.

To resolve this problem, a processor of the computing device may perform operations to remap either the volume adjustment functionality of the first app or the camera control (e.g., take a picture) function of the second app to another available input mechanism. Similarly, the processor may remap either the pause of the first app or the zoom in/out of the second app to another available input mechanism. In this way, the computing device may support seamless picture-taking with the second app while simultaneously enabling a user to watch a video via the first app, as zooming, taking a snapshot, and switching active cameras may not pause the video and snapshots may be taken without affecting the video volume (or causing a pause).

As an example, based on a priority assessment or another ranking mechanism (e.g., ranking data indicated in input profiles of the first and second apps; user inputs that indicate priority; first-come, first served; etc.), the computing device may determine that the first app is the "winning" app (or has priority over the second app). In response to this determination, the device processor may reconfigure a hardware 'home' button to receive user inputs for zooming control of the second app, a voice command via the microphone to switch the active cameras, and a proximity sensor typically used to turn a screen off to receive user inputs to the shutter (or snapshot) control of the second app (e.g., when the user puts the computing device up close to a face, a snapshot may be taken).

As another example, based on another priority ranking, the computing device processor may determine that the first app is the "losing" app (or has lower priority than the second app). In response to this determination, the device processor may configure a voice recognition functionality to receive user inputs for the volume function of the first app may configure an accelerometer unit to receive user inputs for the pause function of the first app.

While the overlapping control condition exists, the computing device processor may also render indicia of any input remappings, such as icons that indicate the new hardware, sensor, or other input mechanisms that are temporarily configured to receive user inputs for the control elements of the losing app. For example, a rendered message or sound may communicate that "pinch to zoom is active because the first app's pause is now associated with accelerometer input."

FIGS. 2A-2C, 3, and 4 are diagrams illustrating scenarios in which a computing device 100 automatically remaps input mechanisms to control elements during an example overlapping control condition according to some embodiments. FIGS. 2A-2C, 3, 4 illustrate different example input mechanism reconfigurations that may be performed by the computing device 100 to overcome overlapping control conditions in which the second application is the losing application (e.g., an intruding or lower priority application). Although the second application is the losing application for illustration purposes in FIGS. 2A-2C, 3, 4, the input mechanisms may be similarly reconfigured to provide inputs to the progress slider control element 104 of the first application display 102 (e.g., in response to the second application having higher priority than the first application). In some embodiments, a processor of the computing device 100 may execute an input manager that is configured to identify the overlapping control condition and enact reconfigurations of input mechanisms with regard to the simultaneously active applications.

The overlapping control condition illustrated in FIGS. 2A-2C, 3, and 4 may be similar to the condition described above with reference to FIG. 1C. In particular, a first application and a second application are illustrated as having simultaneously active (i.e., rendered) displays 102, 150 in common portions (i.e., overlapping) of the touch screen display 120 of the computing device 100. The illustrated overlapping control condition in FIGS. 2A and 2B involves a settings button control element 152a of the second application displays 150 and a progress slider control element 104 of the first application display 102 that overlap (i.e., appear at least partially in the same area of the touch screen display). The illustrated overlapping control condition in FIG. 2C involves a confirmation button control element 152b of the second application displays 150 and the progress slider control element 104 of the first application display 102.

FIG. 2A illustrates an example reconfiguration in which the computing device 100 has reconfigured the first volume button 110a (e.g., a volume "down" hardware button) to be used to provide user inputs to the settings button control element 152a while the overlapping control condition exists. In other words, the user can depress the volume "down" button in order to control the settings functionality of the second application.

FIG. 2B illustrates an example reconfiguration in which the computing device 100 has reconfigured the second volume button 110b (e.g., a volume "up" hardware button) to be used to provide user inputs to the settings button control element 152a while the overlapping control condition exists. In other words, the user can depress the volume "up" button in order to control the settings functionality of the second application.

FIG. 2C illustrates an embodiment reconfiguration in which the computing device 100 has reconfigured the first volume button 110a (e.g., a volume "down" hardware button) to be used to provide user inputs to the confirmation button control element 152b while the overlapping control condition exists. For example, when the progress slider control element 104 moves past the screen coordinates of the settings button control element 152a due to video playback, the computing device 100 may automatically perform a remapping to enable the user to depress the volume "down" button in order to control the confirmation functionality of the second application.

In some embodiments, the computing device 100 may also perform operations to enable the settings button control element 152a to receive touch inputs when the progress slider control element 104 no longer overlaps on the touch screen display. For example, the computing device 100 may reapply default or native mappings for the settings button control element 152a when there is no longer an overlapping control condition related to the settings button control element 152a.

Figure 3:
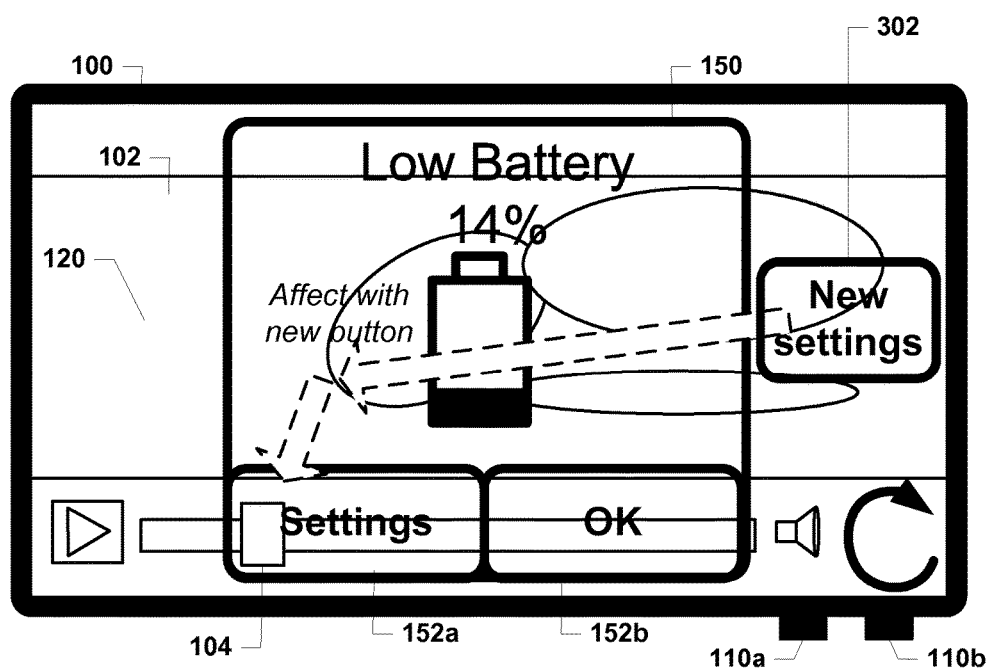
FIG. 3 is a diagram of a mobile computing device illustrating an input mechanism reconfiguration that includes rendering an additional visual element to provide user inputs to a control element according to some embodiments.

FIG. 3 illustrates an example reconfiguration in which the computing device 100 has rendered an additional visual element 302 (e.g., a GUI button) that can be used to provide user inputs to the settings button control element 152a while the overlapping control condition exists. Such an additional visual element 302 may be displayed on a portion of the touch screen display 120 that is not currently associated with any other control element of the application displays 102, 150.

Figure 4:
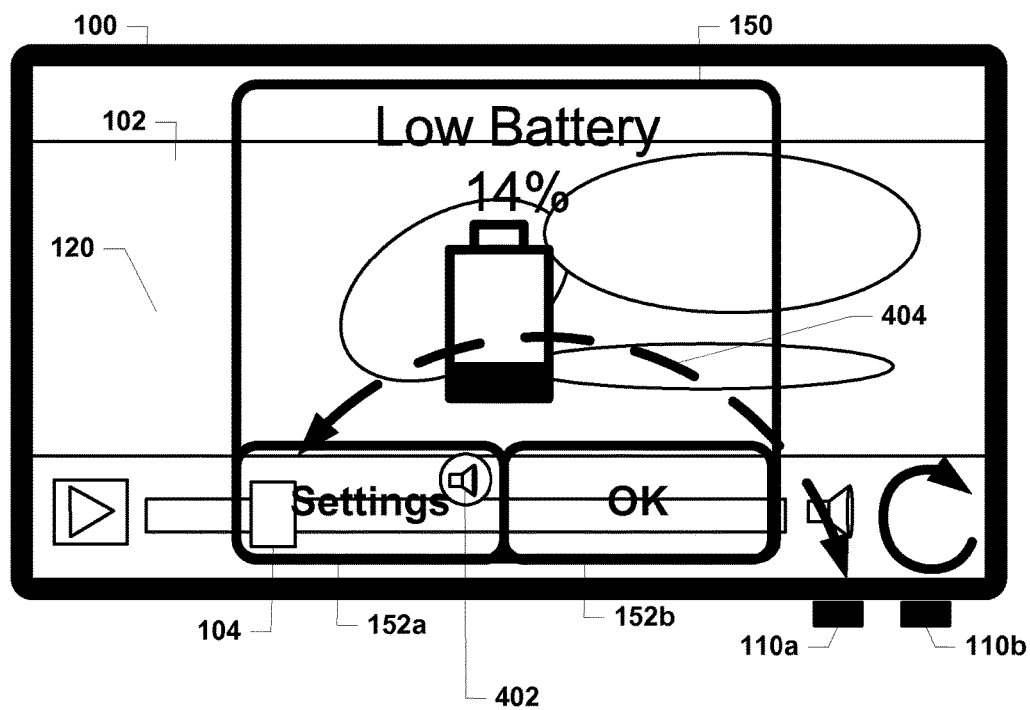
FIG. 4 is a diagram of a mobile computing device illustrating a visual indicator rendered in association with an application corresponding to a remapped input mechanism according to some embodiments.

In some embodiments, visual information may be rendered to inform the user of the computing device 100 regarding when and how the computing device 100 has automatically remapped an input mechanism during an overlapping control condition. As an example, FIG. 4 illustrates an example visual indicator 402 (e.g., a speaker image) that may be rendered to show that the first volume button 110a has been remapped to provide user inputs to the settings button control element 152a during an overlapping control condition. In some embodiments, the computing device 100 may also render other informative graphics, such as an arrow 404 or other directional information that may further inform the user about to the new input mechanism mapping.

Figure 5:
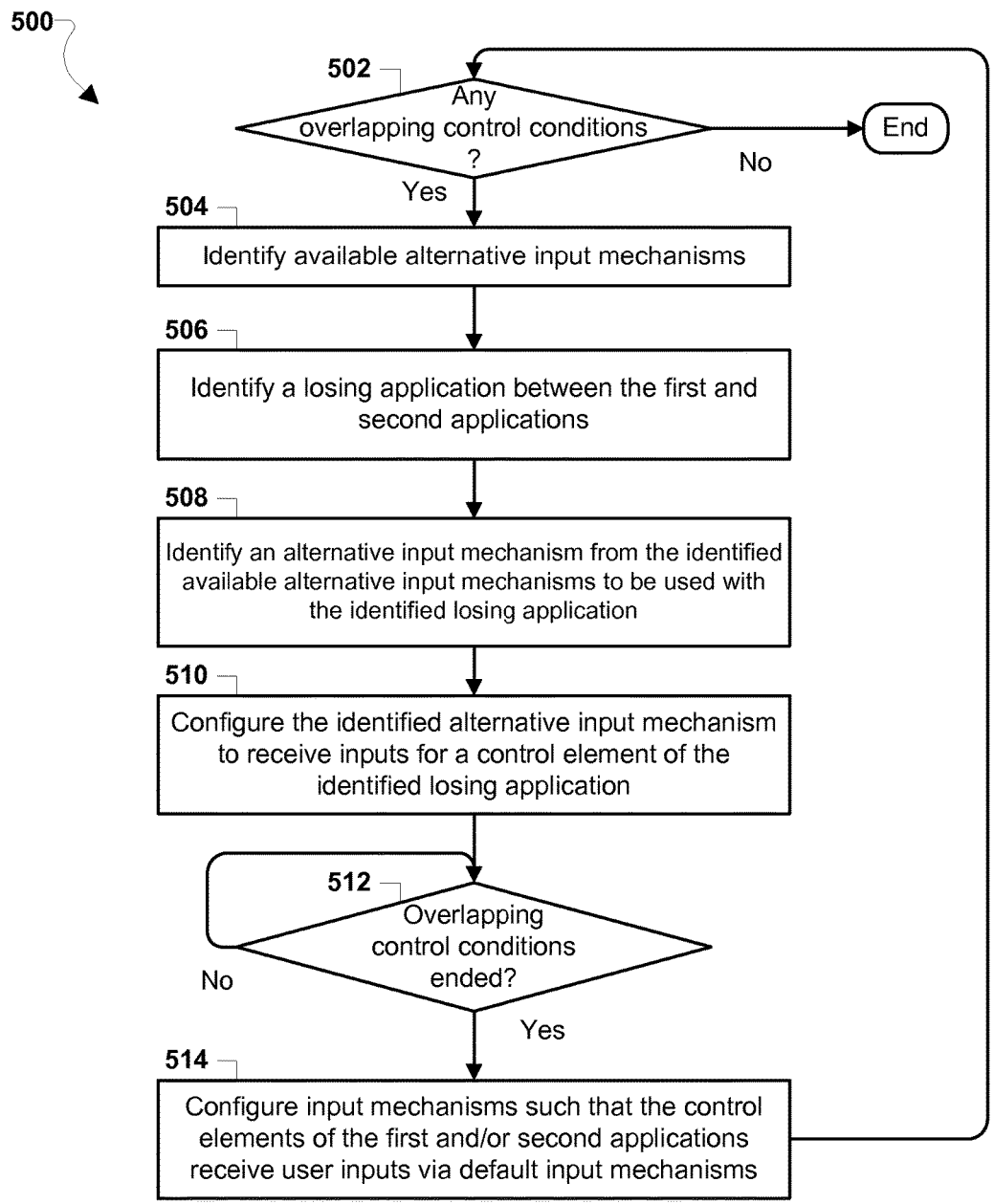
FIG. 5 is a process flow diagram illustrating an embodiment method for a computing device to automatically configure input mechanisms for enabling user inputs to simultaneously-active applications with overlapping control inputs.

FIG. 5 illustrates an embodiment method 500 for a processor of a computing device to automatically reconfigure input mechanisms supported by the computing device for providing user inputs to simultaneously-active applications during overlapping control conditions. The method 500 may be performed by processors of various computing devices, such as the computing device 100 as described with reference to FIGS. 1A-4. Further, although the descriptions may refer to a first and second application for simplicity purposes, the method 500 may also be used to manage overlapping control conditions when any number of applications are active (and rendered) on the computing device.

In some embodiments, the method 500 may be performed continuously whenever two or more applications are executing simultaneously. Further, the method 500 may be performed to reconfigure input mechanisms for one or more overlapping control conditions between two or more simultaneously-running applications. For example, the computing device may perform the method 500 to overcome an overlapping control condition regarding a first set of GUI buttons of a first and second application as well as an overlapping control condition regarding a second set of GUI buttons of the first and second application.

In determination block 502, the processor of the computing device may determine whether an overlapping control condition exists corresponding to a first application and a second application executing on the computing device at a given time. In other words, the processor may determine whether there are one or more overlapping control elements for the simultaneously-active applications (e.g., a video app rendering on a display while a battery warning application runs as a background process for evaluating battery state, etc.). For example, the processor may determine whether a first control element of the first application (e.g., a first GUI button for controlling a video rendering functionality of the first application, etc.) and a second control element of the second application (e.g., a second GUI button for controlling a settings functionality of the second application, etc.) are configured to receive respective user inputs via a common input mechanism, such as the same volume button. In some embodiments, the processor may determine whether touch screen display coordinates corresponding to the first control element of the first application and the second control element of the second application overlap, and determine that the overlapping control condition exists in response to determining that the touch screen display coordinates overlap. For example, the processor may analyze the current coordinates of GUI buttons of the currently rendered applications to identify two or more GUI buttons that are rendered on the same or overlapping portions of the touch screen display of the computing device.

As described above, the processor may also determine that overlapping control conditions exist when the simultaneously-active applications are using commonly-assigned hardware input mechanisms (e.g., physical buttons) for one or more control elements. For example, an overlapping control condition may be recognized when a video app is configured to receive inputs for adjusting volume settings for a video playback via hardware volume buttons on the housing of the computing device, and a camera app is configured to receive inputs to activate a shutter of the camera in response to pressing of one of the hardware volume buttons.

In some embodiments, the processor may identify overlapping control conditions by evaluating a data table that includes a record associated with each of the input mechanisms supported by the computing device. The data table may include data that indicates any current assignments or mappings of the various input mechanisms to control elements of active applications. For example, the data table may include a record that indicates the volume "up" button is currently assigned to a volume adjustment functionality of the first application and/or a fast-forward functionality of the second application. With such a data table, the processor may continually or periodically evaluate the records for the various supported input mechanisms to identify when a particular input mechanism is associated with more than one control element of more than one simultaneously-active application.

In response to determining that there are no overlapping control conditions (i.e., determination block 502="No"), the processor may end the method 500. In some embodiments, the computing device may continue monitoring for overlapping control conditions with the operations of determination block 502 in response to determining that there are no overlapping control conditions.

In response to determining that there is at least one overlapping control condition (i.e., determination block 502="Yes"), the processor of the computing device may identify available alternative input mechanisms in block 504. For example, out of a complete list of a plurality of input mechanisms that are supported for the computing device, the processor may identify all input mechanisms (e.g., software and/or hardware buttons, portions of the touch screen display, voice recognition units, sensors, etc.) that are not currently reserved or otherwise being used by the two or more simultaneously-active applications. In some embodiments, the identification may be made using the data table of all supported input mechanisms as described above. In some embodiments, the processor may utilize input profiles associated with the applications as described below with reference to FIG. 6.

In block 506, the processor of the computing device may identify a losing application between the first and second applications. Again, the term "losing application" refers to the application for which an overlapping or overlapped input mechanism will be reassigned or moved in order to resolve the overlapping control condition detected in determination block 502. For example, the last application to be launched or the application that is rendered below another application (i.e., an application that is not fully visible on the display due to the rendering of another application) may be identified as the losing application. Instead of using native or default input mechanisms, the losing application may receive user inputs via one or more alternative input mechanisms while the overlapping control condition exists.

In some embodiments, the processor may identify the losing application by evaluating data within predefined input profiles for each of the active applications. Such input profiles may include data that is predetermined by application developers and that includes information that lists characteristics of the application. In some embodiments, input profiles may include ranking, importance, or priority values of applications as well as required, frequently used, and/or preferred input mechanisms that may be used by the processor in the event of an overlapping control condition. For example, the processor may compare ranking values from each of the input profiles to determine the application having the lower ranking value (i.e., the "losing" application). A lower priority application may be designated as the losing application to have an input mechanism reconfigured to an alternative input mechanism while the overlapping control condition exists. In some embodiments, the last application to be rendered on the screen may be determined to be the losing application in a first-come, first-served method of selecting the winning and losing applications.

In some embodiments, preferred alternative input mechanisms listed in input profiles of the simultaneously-active applications may be used to identify the losing application. For example, regardless of any ranking values of the first application or second application (e.g., based on user profile data, first-come, first-serve, etc.), the processor may determine that the first application is the losing application when none of the second application's preferred alternative input mechanisms are available but at least one of the first application's preferred alternative input mechanisms is available for remapping. In other words, the computing device may identify the losing application as the application best able to accommodate alternative user inputs.

In block 508, the processor of the computing device may identify an alternative input mechanism from the identified available alternative input mechanisms to be used with the identified losing application. For example, the alternative input mechanism may be used for providing user inputs to a control element of the losing application. In some embodiments, the identification of an appropriate alternative input mechanism for the losing application may be based on the input profile of the losing application. For example, the processor may compare a list of ordered alternative input mechanisms in the input profile to the list of currently available input mechanisms and select the first matching input mechanism to be reconfigured as an alternative input mechanism. In some embodiments, the input profile of the losing application may or may not list any preferred or otherwise predefined input mechanisms. In such embodiments, the computing device may simply select any available input mechanism as the alternative input mechanism.

In block 510, the processor of the computing device may reconfigure the identified alternative input mechanism of the losing application to receive user inputs for a control element of the identified losing application. In particular, the processor of the computing device may reconfigure one of the identified available input mechanisms to provide input for the control element of the losing application while the overlapping control condition persists (e.g., the GUI button of the losing application that shares the same display coordinates as another GUI button of the winning application). For example, in response to determining that the functioning of the control elements of the first application are not to be changed (i.e., the first application is the priority or "winning" app), the processor may reconfigure a volume button to receive user inputs for an overlapping control element of the second application (i.e., the non-priority or "losing" app). As another example, the processor may reconfigure a second hardware button to provide inputs for a control element of the losing app in response to determining that both the winning app and the losing app are natively configured to utilize a first hardware button to receive inputs for different control elements.

In some embodiments, the processor may reconfigure a plurality of the available input mechanisms and/or a sequence of input mechanisms to receive user inputs for the overlapping control element of a losing application in block 510. For example, the computing device may reconfigure both a voice recognition module and a volume button to be the combined input mechanisms for receiving user inputs to adjust the progress of a video played via the second application.

In determination block 512, the processor of the computing device may determine whether the overlapping control condition has ended. For example, the computing device may continually or periodically evaluate the screen coordinates of currently rendered GUI elements to determine whether any previously-identified overlaps in GUI elements no longer exist. In some embodiments, overlapping control conditions may no longer exist when one or more of the applications being ended, closed, and/or minimized. In response to determining that the overlapping control condition has not ended (i.e., determination block 512="No"), the computing device may continue monitor the overlapping control condition in determination block 512.

In response to determining that the overlapping control condition has ended (i.e., determination block 512="Yes"), the processor of the computing device may configure input mechanisms such that the control elements of the first application and/or the second application (if either or both applications are still executing) receive user inputs via default (or native) input mechanisms in block 514. In other words, if the losing application is still executing, any control elements of the losing application that were configured to receive user inputs from alternative input mechanisms with the operations in block 510 may be returned to using original or default input mechanisms. For example, when a volume functionality of a video app is programmed to be natively controlled by hardware volume buttons (i.e., by default), the processor may reconfigure the hardware volume buttons to provide user inputs to the volume functionality of the video app when another application is no longer using the hardware volume buttons (e.g., when that application has closed). In some embodiments, the default or native input mechanisms may be listed in input profiles for each application. The operations of block 514 may be optional for some control elements of the first and second applications that are still configured to use default input mechanisms (i.e., when no reconfigurations of input mechanisms for those control elements were enacted). The computing device may continue checking for additional or newly occurring overlapping control conditions in determination block 502.

Figure 6:
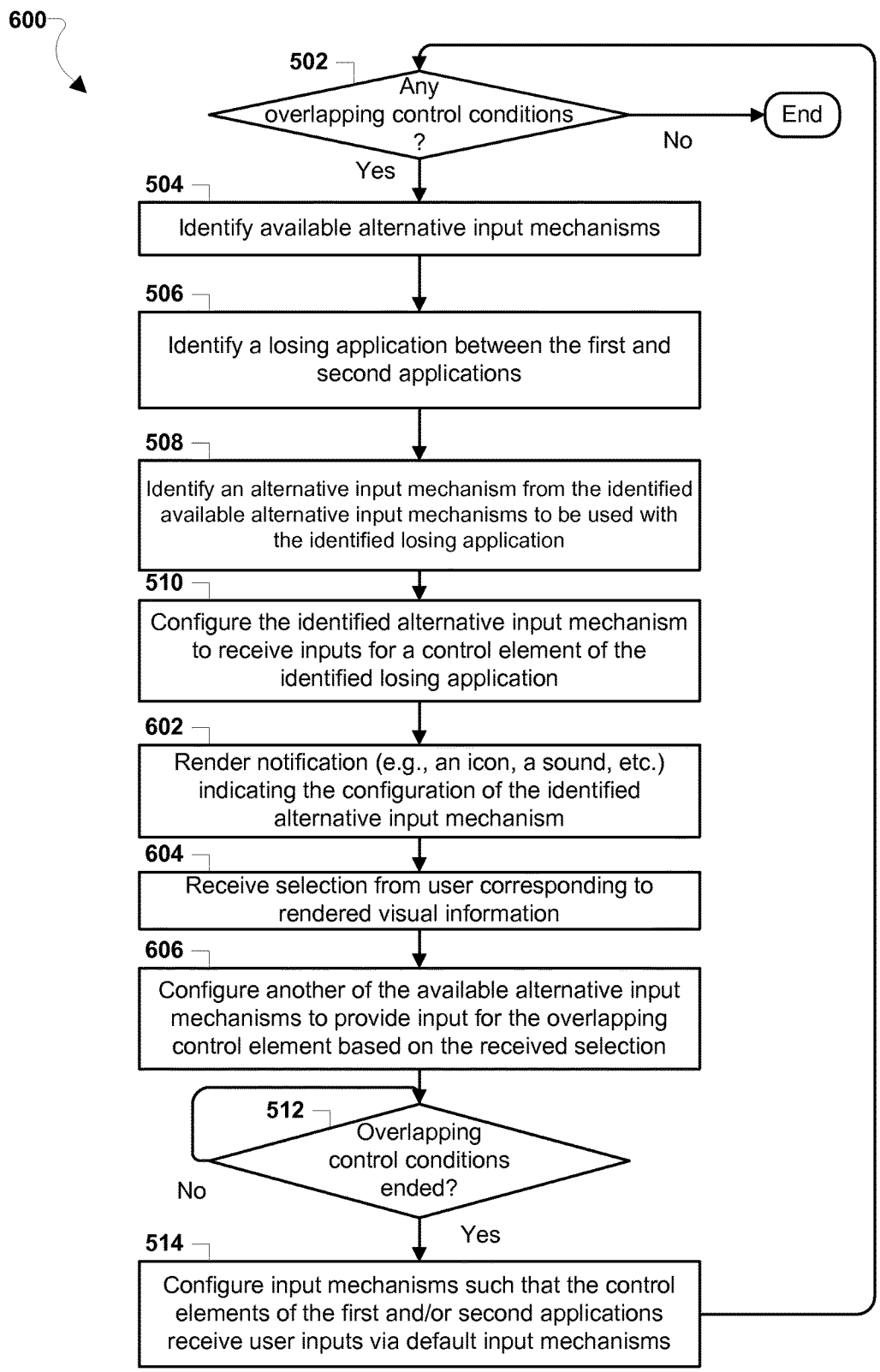
FIG. 6 is a process flow diagram illustrating an embodiment method for a computing device to render notifications and configure input mechanisms.

FIG. 6 illustrates an embodiment method 600 for a processor of a computing device to render notifications and configure input mechanisms. The method 600 may be similar to the method 500 described with reference to FIG. 5, except that the method 600 may include explicit operations for rendering notifications that may provide the user of the computing device with a prompt or opportunity to reconfigure automatic configurations of control elements due to overlapping control conditions. For example, in response to configuring the power button to control a function of an app, the computing device may render other alternative input mechanisms that the user may select to provide inputs for the function instead of the power button. The method 600 may be performed by processors of various computing devices, such as the computing device 100 as described with reference to FIGS. 1A-4. In some embodiments, the method 600 may be performed continuously whenever two or more applications are executing simultaneously.

In the method 600, the processor of the computing device may perform operations in blocks 502-510 that are similar to operations of like numbered blocks of the method 500 described above with reference to FIG. 5. In response to performing the configuring operations of block 510, the processor of the computing device may render a notification indicating the reconfiguration of the identified alternative input mechanism in block 602. For example, the processor may render a visual icon, text, and/or an arrow graphic that provides a cue for the user to begin using the now-assigned input mechanism to provide particular inputs for the losing application. As another example, the processor may play a sound (e.g., a beep, etc.) and/or emit a buzz/vibration. Some exemplary visual notifications are described with reference to FIG. 4.

In some embodiments, the notification rendered in block 602 may include interactive elements. For example, the rendered notification may be an interactive selection list GUI element that may present an indication of the re-configured input mechanism, as well as the currently available input mechanisms of the computing device. With such a selection list, the user may manually override the automatic assignment made by the processor by selecting another input mechanism. For example, the user may prefer to have a volume "up" button receive user inputs for a settings control element of a warning application instead of a volume "down" button. Accordingly, in block 604, the processor of the computing device may receive a user selection responding to rendered visual information (e.g., the rendered selection list).

In block 606, the processor of the computing device may configure (or reconfigure) another one of the available alternative input mechanisms to receive user input for the overlapping control element of the losing application based on the selection received from the user. The computing device may then continue with the operations in determination block 512 as described.

Figure 7:
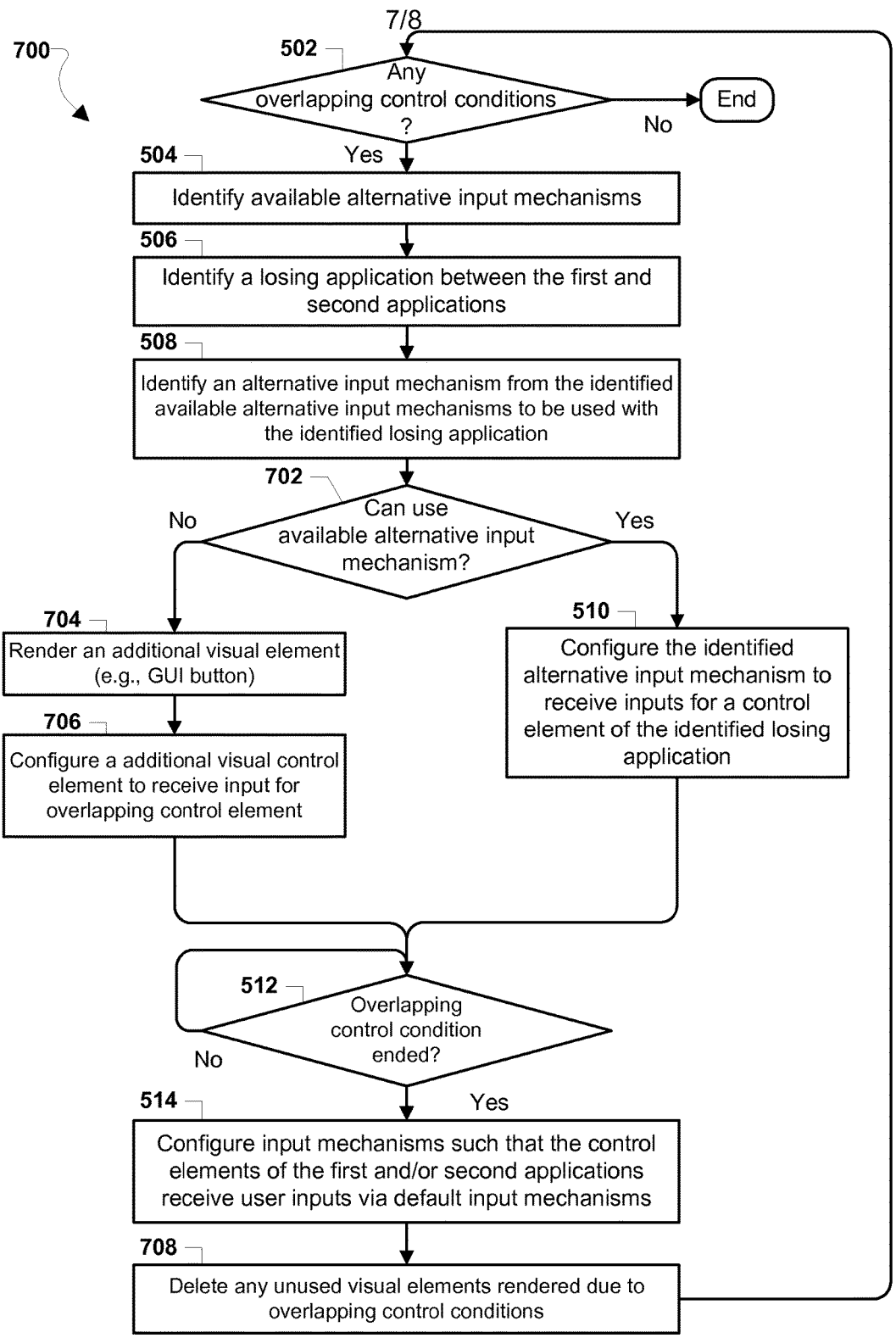
FIG. 7 is a process flow diagram illustrating an embodiment method for automatically generating and configuring a new input mechanism for use with an application during an overlapping control condition.

FIG. 7 illustrates an embodiment method 700 for a processor of a computing device to automatically generate and configure a new input mechanism for use with an application during an overlapping control condition. The method 700 may be similar to the method 500 described with reference to FIG. 5, except that the method 700 may include operations for rendering additional, new touch input elements on a touch screen display to be used for receiving inputs for an overlapping control element. For example, the processor may render a new GUI button on the touch screen display that is not native to the active applications, but that is configured to receive user inputs for a control element of a low-priority or losing application during an overlapping control condition. The method 700 may be performed by a processor of various computing devices, such as the computing device 100 as described with reference to FIGS. 1A-4. In some embodiments, the method 700 may be performed continuously whenever two or more applications are executing simultaneously.

In the method 700, the processor may perform operations in blocks 502-514 that are similar to the operations of like numbered blocks of the method 500 described above with reference to FIG. 5. In determination block 702, the processor of the computing device may determine whether an available alternative input mechanism may be mapped to the overlapping control element of one of the simultaneously-active applications (e.g., to the losing application's overlapping control element). For example, the processor may determine whether any pre-existing input mechanism is available for use in re-configuration operations or whether any available input mechanism is compatible with the overlapping control element of the losing application.

In some embodiments, the computing device may evaluate an input profile of the losing application to determine whether available alternative input mechanisms or a new additional input mechanism should be used for providing inputs to the overlapping control element of the losing application. For example, an input profile of the losing application may include a flag or other data that indicates whether the processor should or should not utilize new visual elements when reconfiguring input mechanisms during an overlapping control condition involving the losing application and/or the particular overlapping control element.

In response to determining that an available alternative input mechanism may be mapped to the overlapping control element of one of the simultaneously-active applications (or a losing application) (i.e., determination block 702="Yes"), the processor may reconfigure the identified alternative available input mechanism in block 510 as described with reference to FIG. 5.

In response to determining that no available alternative input mechanism may be mapped to the overlapping control element of one of the simultaneously-active applications (i.e., determination block 702="No"), the processor of the computing device may render an additional visual element in block 704, such as a new GUI button, a slider, or another element. The new visual element may be rendered on a particular portion of the touch screen display of the computing device. In some embodiments, the characteristics of the visual element may be defined by data within an input profile of the losing application. For example, the input profile may indicate the language, position, color, and/or size of the new visual element. In block 706, the processor of the computing device may configure the additional visual control element to receive input for the overlapping control element of the losing application. For example, the computing device may configure a portion of the touch screen corresponding to the coordinates of the additional visual element to provide input for the overlapping control element whenever the user touches the portion.

In response to performing the operations of block 706 or block 510, the processor of the computing device may perform the determination operations in determination block 512 as described. In response to determining that the overlapping control condition has ended (i.e., determination block 512="Yes"), the processor of the computing device may perform the configuration operations to reconfigure user inputs to default input mechanisms in block 514 and may delete any unused visual elements rendered due to overlapping control conditions in optional block 708. For example, once the overlapping control condition ends (e.g., one of the simultaneously-active applications is closed, hidden, and/or minimized), the additional visual element may no longer be rendered and the default input mechanism configurations may be reinstated in block 502.

Various forms of computing devices, including smartphone-type and tablet-type mobile computing devices, may be used to implement the various embodiments. Such computing devices typically include the components illustrated in FIG. 8 which illustrates an example smartphone-type computing device 100. Such a computing device 100 may include a processor 801 coupled to a touch screen display controller 804 and an internal memory 802. The processor 801 may be one or more multicore ICs designated for general or specific processing tasks. The internal memory 802 may be volatile or non-volatile memory, and may also be secure and/or encrypted memory, or unsecure and/or unencrypted memory, or any combination thereof. The touch screen display controller 804 and the processor 801 may also be coupled to a touch screen display 120 (or touch sensitive panel), such as a resistive-sensing touch screen display, capacitive-sensing touch screen display, infrared sensing touch screen display, etc. The computing device 100 may have one or more radio signal transceivers 808 (e.g., Bluetooth®, ZigBee®, Wi-Fi®, RF radio) and antennae 810, for sending and receiving, coupled to each other and/or to the processor 801. The transceivers 808 and antennae 810 may be used with the above-mentioned circuitry to implement the various wireless transmission protocol stacks and interfaces. The computing device 100 may include a cellular network wireless modem chip 816 that enables communication via a cellular network and is coupled to the processor. The computing device 100 may include a peripheral device connection interface 818 coupled to the processor 801. The peripheral device connection interface 818 may be singularly configured to accept one type of connection, or multiply configured to accept various types of physical and communication connections, common or proprietary, such as USB, FireWire, Thunderbolt, or PCIe. The peripheral device connection interface 818 may also be coupled to a similarly configured peripheral device connection port (not shown). The computing device 100 may also include speakers 814 for providing audio outputs. The computing device 100 may also include a housing 820, constructed of a plastic, metal, or a combination of materials, for containing all or some of the components discussed herein. The computing device 100 may include a power source 822 coupled to the processor 801, such as a disposable or rechargeable battery. The rechargeable battery may also be coupled to the peripheral device connection port to receive a charging current from a source external to the computing device 100. The computing device 100 may further include various buttons coupled to the processor 801 and that are configured to receive interactions with a user, such as volume buttons 110*a*-110*b* and a power button 850.

The various processors described herein may be any programmable microprocessor, microcomputer or multiple processor chip or chips that can be configured by software instructions (applications) to perform a variety of functions, including the functions of the various embodiments described herein. In the various devices, multiple processors may be provided, such as one processor dedicated to wireless communication functions and one processor dedicated to running other applications. Typically, software applications may be stored in internal memory before they are accessed and loaded into the processors. The processors may include internal memory sufficient to store the application software instructions. In many devices the internal memory may be a volatile or nonvolatile memory, such as flash memory, or a mixture of both. For the purposes of this description, a general reference to memory refers to memory accessible by the processors including internal memory or removable memory plugged into the various devices and memory within the processors.

The foregoing method descriptions and the process flow diagrams are provided merely as illustrative examples and are not intended to require or imply that the operations of the various embodiments must be performed in the order presented. As will be appreciated by one of skill in the art the order of operations in the foregoing embodiments may be performed in any order. Words such as "thereafter," "then," "next," etc. are not intended to limit the order of the operations; these words are simply used to guide the reader through the description of the methods. Further, any reference to claim elements in the singular, for example, using the articles "a," "an" or "the" is not to be construed as limiting the element to the singular.

The various illustrative logical blocks, modules, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present claims.

The hardware used to implement the various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more exemplary embodiments, the functions described may be implemented in hardware, software, firmware, or any combination thereof. If implemented in software, the functions may be stored on or transmitted over as one or more instructions or code on a non-transitory processor-readable, computer-readable, or server-readable medium or a non-transitory processor-readable storage medium. The operations of a method or algorithm disclosed herein may be embodied in a processor-executable software module or processor-executable software instructions which may reside on a non-transitory computer-readable storage medium, a non-transitory server-readable storage medium, and/or a non-transitory processor-readable storage medium. In various embodiments, such instructions may be stored processor-executable instructions or stored processor-executable software instructions. Tangible, non-transitory computer-readable storage media may be any available media that may be accessed by a computer. By way of example, and not limitation, such non-transitory computer-readable media may comprise RAM, ROM, EEPROM, CD-ROM or other optical disk storage, magnetic disk storage or other magnetic storage devices, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of non-transitory computer-readable media. Additionally, the operations of a method or algorithm may reside as one or any combination or set of codes and/or instructions on a tangible, non-transitory processor-readable storage medium and/or computer-readable medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the spirit or scope of the claims. Thus, the present invention is not intended to be limited to the embodiments shown herein but is to be accorded the widest scope consistent with the following claims and the principles and novel features disclosed herein.

What is claimed is:

1. A method for automatically configuring input mechanisms supported by a computing device to receive user inputs for simultaneously-active applications, comprising:
   determining, via a processor of the computing device, whether an overlapping control condition exists among the simultaneously-active applications, wherein overlapping control conditions exist when a first control element of a first application and a second control element of a second application are configured to receive different user inputs via a common input mechanism;

identifying, via the processor, available alternative input mechanisms supported by the computing device in response to determining that an overlapping control condition exists; and reconfiguring, via the processor, one of the identified available alternative input mechanisms to receive user inputs for one of the first control element or the second control element while the overlapping control condition exists.

2. The method of claim 1, wherein determining, via the processor of the computing device, whether an overlapping control condition exists among the simultaneously-active applications comprises determining, via the processor, that an overlapping control condition exists in response to determining that touch screen display coordinates corresponding to the first control element and the second control element overlap.

3. The method of claim 1, wherein identifying, via the processor, available alternative input mechanisms supported by the computing device comprises identifying, via the processor, input mechanisms supported by the computing device that are not currently configured to receive inputs for any control elements of the simultaneously-active applications.

4. The method of claim 1, wherein reconfiguring, via the processor, one of the identified available alternative input mechanisms to receive user inputs for one of the first control element or the second control element while the overlapping control condition exists comprises:

identifying, via the processor, one of the first application or the second application as a losing application based on input profiles of the first application and the second application;

identifying, via the processor, an alternative input mechanism from the identified available alternative input mechanisms based on an input profile of the losing application; and reconfiguring, via the processor, the identified alternative input mechanism to receive the user inputs for an overlapping control element of the losing application while the overlapping control condition exists, wherein the overlapping control element is one or the first control element or the second control element.

5. The method of claim 4, wherein the input profiles of the first application and the second application each include at least priority information and preferred alternative input mechanisms.

6. The method of claim 1, wherein reconfiguring, via the processor, one of the identified available alternative input mechanisms to receive user inputs for one of the first control element or the second control element while the overlapping control condition exists comprises:

rendering, via the processor, an additional visual element while the overlapping control condition exists; and reconfiguring, via the processor, a portion of a touch screen display corresponding to the additional visual element to receive the user inputs for one of the first control element or the second control element while the overlapping control condition exists.

7. The method of claim 6, wherein the additional visual element is a graphical user interface (GUI) button.

8. The method of claim 1, further comprising rendering, via the processor, a notification identifying the one of the identified available alternative input mechanisms that is reconfigured to receive the user inputs for one of the first control element or the second control element while the overlapping control condition exists.

9. The method of claim 8, wherein the rendered notification includes an interactive selection list, the method further comprising:

receiving, via the processor, a user selection on the interactive selection list; and reconfiguring, via the processor, another of the identified available alternative input mechanisms to receive the user inputs for one of the first control element or the second control element while the overlapping control condition exists based on the received user selection.

10. The method of claim 1, wherein input mechanisms supported by the computing device include one or more of a portion of a touch screen display of the computing device, a hardware button on the computing device, a peripheral coupled to the computing device, a sound/voice recognition module, and a sensor coupled to the computing device.

11. A computing device, comprising:

a memory;

a touch screen display;

a plurality of input mechanisms; and a processor coupled to the memory, the touch screen display in the plurality of input mechanisms, and configured with processor-executable instructions to perform operations comprising:

determining whether an overlapping control condition exists among simultaneously-active applications, wherein overlapping control conditions exist when a first control element of a first application and a second control element of a second application are configured to receive different user inputs via a common input mechanism;

identifying available alternative input mechanisms from the plurality of input mechanisms in response to determining that an overlapping control condition exists; and reconfiguring one of the identified available alternative input mechanisms to receive user inputs for one of the first control element or the second control element while the overlapping control condition exists.

12. The computing device of claim 11, wherein the processor is configured with processor-executable instructions to perform operations such that determining whether an overlapping control condition exists among the simultaneously-active applications comprises determining that an overlapping control condition exists in response to determining that touch screen display coordinates corresponding to the first control element and the second control element overlap.

13. The computing device of claim 11, wherein the processor is configured with processor-executable instructions to perform operations such that identifying available alternative input mechanisms from the plurality of input mechanisms comprises identifying any of the plurality of input mechanisms that are not currently configured to receive user inputs for any control elements of the simultaneously-active applications.

14. The computing device of claim 11, wherein the processor is configured with processor-executable instructions to perform operations such that reconfiguring one of the identified available alternative input mechanisms to receive user inputs for one of the first control element or the second control element while the overlapping control condition exists comprises:

identifying one of the first application and the second application as a losing application based on input profiles of the first application and the second application;

identifying an alternative input mechanism from the identified available alternative input mechanisms based on an input profile of the identified losing application; and reconfiguring the identified alternative input mechanism to receive user inputs for an overlapping control element of the losing application while the overlapping control condition exists, wherein the overlapping control element is one or the first control element or the second control element.

15. The computing device of claim 14, wherein the input profiles of the first application and the second application each include at least priority information and preferred alternative input mechanisms.

16. The computing device of claim 11, wherein the processor is configured with processor-executable instructions to perform operations such that reconfiguring one of the identified available alternative input mechanisms to receive user inputs for one of the first control element or the second control element while the overlapping control condition exists comprises:

rendering an additional visual element while the overlapping control condition exists; and configuring a portion of the touch screen display corresponding to the additional visual element to receive user inputs for one of the first control element or the second control element while the overlapping control condition exists.

17. The computing device of claim 16, wherein the additional visual element is a graphical user interface (GUI) button.

18. The computing device of claim 11, wherein the processor is configured with processor-executable instructions to perform operations further comprising rendering a notification identifying the one of the identified available alternative input mechanisms that is reconfigured to receive the user inputs for one of the first control element or the second control element while the overlapping control condition exists.

19. The computing device of claim 18, wherein the processor is configured with processor-executable instructions to perform operations such that the rendered notification includes an interactive selection list, and wherein the processor is configured with processor-executable instructions to perform operations further comprising:

receiving a user selection on the interactive selection list; and reconfiguring another of the identified available alternative input mechanisms to receive the user inputs for one of the first control element or the second control element while the overlapping control condition exists based on the received user selection.

20. The computing device of claim 11, wherein the plurality of input mechanisms supported include one or more of a portion of a touch screen display of the computing device, a hardware button on the computing device, a peripheral coupled to the computing device, a sound/voice recognition module, and a sensor coupled to the computing device.

21. A non-transitory processor-readable storage medium having stored thereon processor-executable instructions configured to cause a processor of a computing device to perform operations comprising:

determining whether an overlapping control condition exists among simultaneously-active applications, wherein overlapping control conditions exist when a first control element of a first application and a second control element of a second application are configured to receive different user inputs via a common input mechanism;

identifying available alternative input mechanisms supported by the computing device in response to determining that an overlapping control condition exists; and reconfiguring one of the identified available alternative input mechanisms to receive user inputs for one of the first control element or the second control element while the overlapping control condition exists.

22. The non-transitory processor-readable storage medium of claim 21, wherein the stored processor-executable instructions are configured to cause the processor of the computing device to perform operations such that whether an overlapping control condition exists among simultaneously-active applications comprises determining that an overlapping control condition exists in response to determining that touch screen display coordinates corresponding to the first control element and the second control element overlap.

23. The non-transitory processor-readable storage medium of claim 21, wherein the stored processor-executable instructions are configured to cause the processor of the computing device to perform operations such that identifying available alternative input mechanisms supported by the computing device comprises identifying input mechanisms supported by the computing device that are not currently configured to receive inputs for any control elements of the simultaneously-active applications.

24. The non-transitory processor-readable storage medium of claim 21, wherein the stored processor-executable instructions are configured to cause the processor of the computing device to perform operations such that reconfiguring one of the identified available alternative input mechanisms to receive user inputs for one of the first control element or the second control element while the overlapping control condition exists comprises:

identifying one of the first application or the second application as a losing application based on input profiles of the first application and the second application;

identifying an alternative input mechanism from the identified available alternative input mechanisms based on an input profile of the losing application; and reconfiguring the identified alternative input mechanism to receive user inputs for an overlapping control element of the losing application while the overlapping control condition exists, wherein the overlapping control element is one or the first control element or the second control element.

25. The non-transitory processor-readable storage medium of claim 24, wherein the input profiles of the first application and the second application each include at least priority information and preferred alternative input mechanisms.

26. The non-transitory processor-readable storage medium of claim 21, wherein the stored processor-executable instructions are configured to cause the processor of the computing device to perform operations such that reconfiguring one of the identified available alternative input mechanisms to receive user inputs for one of the first control element or the second control element while the overlapping control condition exists comprises:

rendering an additional visual element while the overlapping control condition exists; and reconfiguring a portion of a touch screen display corresponding to the additional visual element to receive the user inputs for the one of the first control element or the second control element while the overlapping control condition exists.

27. The non-transitory processor-readable storage medium of claim 26, wherein the additional visual element is a graphical user interface (GUI) button.

28. The non-transitory processor-readable storage medium of claim 21, wherein the stored processor-executable instructions are configured to cause the processor of the computing device to perform operations further comprising rendering a notification identifying the one of the identified available alternative input mechanisms that is reconfigured to receive the user inputs for one of the first control element or the second control element while the overlapping control condition exists.

29. The non-transitory processor-readable storage medium of claim 28, wherein the rendered notification includes an interactive selection list, and wherein the stored processor-executable instructions are configured to cause the processor of the computing device to perform operations further comprising:

receiving a user selection on the interactive selection list; and reconfiguring another of the identified available alternative input mechanisms to receive the user inputs for one of the first control element or the second control element while the overlapping control condition exists based on the received user selection.

30. A computing device, comprising:

a touch screen display;

means for determining whether an overlapping control condition exists among simultaneously-active applications, wherein overlapping control conditions exist when a first control element of a first application and a second control element of a second application are configured to receive different user inputs via a common input mechanism;

means for identifying available alternative input mechanisms supported by the computing device in response to determining that an overlapping control condition exists; and means for reconfiguring one of the identified available alternative input mechanisms to receive user inputs for one of the first control element or the second control element while the overlapping control condition exists.

* * * * *